(12) United States Patent
Mahalank et al.

(10) Patent No.: US 11,018,971 B2
(45) Date of Patent: May 25, 2021

(54) METHODS, SYSTEMS, AND COMPUTER READABLE MEDIA FOR DISTRIBUTING NETWORK FUNCTION (NF) TOPOLOGY INFORMATION AMONG PROXY NODES AND FOR USING THE NF TOPOLOGY INFORMATION FOR INTER-PROXY NODE MESSAGE ROUTING

(71) Applicant: Oracle International Corporation, Redwood Shores, CA (US)

(72) Inventors: Shashikiran Bhalachandra Mahalank, Bangalore (IN); Gokul Narayanan, Kerala (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/601,380

(22) Filed: Oct. 14, 2019

(65) Prior Publication Data
US 2021/0111985 A1    Apr. 15, 2021

(51) Int. Cl.
*H04L 12/24* (2006.01)
*H04L 12/751* (2013.01)
*H04L 29/08* (2006.01)

(52) U.S. Cl.
CPC .......... *H04L 45/02* (2013.01); *H04L 41/0806* (2013.01); *H04L 67/10* (2013.01); *H04L 67/28* (2013.01)

(58) Field of Classification Search
CPC ..... H04L 45/02; H04L 41/0806; H04L 67/10; H04L 67/28

(Continued)

(56) References Cited

U.S. PATENT DOCUMENTS 5,592,672 A  *  1/1997 Grewal ............... H04Q 3/0025
                                               709/238
5,719,861 A     2/1998 Okanoue
                        (Continued)

FOREIGN PATENT DOCUMENTS

CN         1700694 A    11/2005
CN       101151861 A     3/2008
              (Continued)

OTHER PUBLICATIONS

Notice of Allowance and Fee(s) Due for U.S. Appl. No. 16/176,920 (dated Apr. 16, 2020).

(Continued)

*Primary Examiner* — Ruolei Zong
(74) *Attorney, Agent, or Firm* — Jenkins, Wilson, Taylor & Hunt, P.A.

(57) ABSTRACT

A method for distributing network function (NF) topology information among proxy nodes and for using the NF topology information for inter-proxy node message routing includes configuring a first proxy node as a leader service communications proxy (SCP). The method further includes configuring a plurality of second proxy nodes as worker proxy nodes. The method further includes registering the worker proxy nodes with the leader SCP. The method further includes subscribing, by the worker proxy nodes and with the leader SCP, to receive NF topology information from the leader SCP. The method further includes, at the leader SCP, receiving NF topology information from the worker proxy nodes and communicating the NF topology information to the worker proxy nodes subscribed to receive the NF topology information. The method further includes, at the worker proxy nodes, using the NF topology information to route messages to proxy nodes serving destination NFs.

20 Claims, 6 Drawing Sheets

(58) Field of Classification Search
USPC .......................................................... 709/222
See application file for complete search history.

(56) References Cited

U.S. PATENT DOCUMENTS

| | | | |
|---|---|---|---|
| 6,105,034 | A | 8/2000 | Buckler |
| 6,366,577 | B1 | 4/2002 | Donovan |
| 6,385,198 | B1 | 5/2002 | Ofek et al. |
| 6,404,746 | B1 | 6/2002 | Cave et al. |
| 6,735,291 | B1 | 5/2004 | Schmid et al. |
| 7,308,499 | B2 | 12/2007 | Chavez |
| 7,742,421 | B2 | 6/2010 | Bantukul et al. |
| 7,929,419 | B2 | 4/2011 | Sprague |
| 8,498,202 | B2 | 7/2013 | Kanode et al. |
| 9,071,512 | B2 | 6/2015 | Marsico |
| 10,299,128 | B1 | 5/2019 | Suthar et al. |
| 10,361,843 | B1 | 7/2019 | Suthar et al. |
| 10,595,256 | B1 | 3/2020 | Marupaduga et al. |
| 10,609,154 | B2 | 3/2020 | Talebi Fard et al. |
| 10,616,934 | B2 | 4/2020 | Talebi Fard et al. |
| 10,778,527 | B2 | 9/2020 | Assali et al. |
| 2001/0039585 | A1 | 11/2001 | Primak et al. |
| 2003/0086410 | A1 | 5/2003 | Eikkula |
| 2004/0088424 | A1 | 5/2004 | Park et al. |
| 2004/0114744 | A1 | 6/2004 | Trossen |
| 2004/0158606 | A1 | 8/2004 | Tsai |
| 2004/0205190 | A1 | 10/2004 | Chong et al. |
| 2004/0221061 | A1 | 11/2004 | Chavez |
| 2005/0207402 | A1 | 9/2005 | Kobayashi et al. |
| 2005/0227685 | A1 | 10/2005 | Costa Requena et al. |
| 2005/0232407 | A1 | 10/2005 | Craig et al. |
| 2006/0010321 | A1 | 1/2006 | Nakamura et al. |
| 2006/0069776 | A1 | 3/2006 | Shim et al. |
| 2006/0101143 | A1 | 5/2006 | Garcia et al. |
| 2006/0104210 | A1 | 5/2006 | Nielsen |
| 2006/0253563 | A1 | 11/2006 | Yang et al. |
| 2007/0156909 | A1 | 7/2007 | Osborn et al. |
| 2007/0191004 | A1 | 8/2007 | Yamakawa et al. |
| 2008/0280623 | A1 | 11/2008 | Danne et al. |
| 2009/0185494 | A1 | 7/2009 | Li et al. |
| 2009/0268723 | A1 | 10/2009 | Przybysz |
| 2010/0261490 | A1 | 10/2010 | Berry et al. |
| 2012/0079082 | A1 | 3/2012 | Ding et al. |
| 2013/0029708 | A1 | 1/2013 | Fox et al. |
| 2015/0003296 | A1* | 1/2015 | Fan ..................... H04L 41/0886 370/255 |
| 2015/0249588 | A1* | 9/2015 | Leon ................... H04L 12/4625 709/204 |
| 2015/0351084 | A1* | 12/2015 | Werb .................... H04W 12/08 370/329 |
| 2016/0149811 | A1* | 5/2016 | Roch ..................... H04L 45/745 370/392 |
| 2016/0352588 | A1 | 12/2016 | Subbarayan et al. |
| 2017/0220367 | A1* | 8/2017 | Li ......................... G06F 16/183 |
| 2017/0353387 | A1* | 12/2017 | Kwak .................... H04L 45/38 |
| 2018/0227243 | A1* | 8/2018 | Zhang .................... H04L 41/12 |
| 2018/0324646 | A1 | 11/2018 | Lee et al. |
| 2018/0343567 | A1 | 11/2018 | Ashrafi |
| 2019/0045351 | A1 | 2/2019 | Zee et al. |
| 2019/0075552 | A1 | 3/2019 | Yu et al. |
| 2019/0116486 | A1 | 4/2019 | Kim et al. |
| 2019/0116521 | A1 | 4/2019 | Qiao et al. |
| 2019/0158364 | A1 | 5/2019 | Zhang et al. |
| 2019/0173740 | A1 | 6/2019 | Zhang et al. |
| 2019/0174561 | A1 | 6/2019 | Sivavakeesar |
| 2019/0182875 | A1 | 6/2019 | Talebi Fard et al. |
| 2019/0191348 | A1 | 6/2019 | Futaki et al. |
| 2019/0191467 | A1 | 6/2019 | Dao et al. |
| 2019/0223093 | A1 | 7/2019 | Watfa et al. |
| 2019/0261244 | A1 | 8/2019 | Jung et al. |
| 2019/0306907 | A1 | 10/2019 | Andreoli-Fang et al. |
| 2019/0313236 | A1 | 10/2019 | Lee et al. |
| 2019/0313437 | A1 | 10/2019 | Jung et al. |
| 2019/0313469 | A1 | 10/2019 | Karampatsis et al. |
| 2019/0335002 | A1 | 10/2019 | Bogineni et al. |
| 2019/0335534 | A1 | 10/2019 | Atarius et al. |
| 2019/0342921 | A1 | 11/2019 | Loehr et al. |
| 2019/0349901 | A1 | 11/2019 | Basu Mallick et al. |
| 2019/0357092 | A1 | 11/2019 | Jung et al. |
| 2019/0380031 | A1 | 12/2019 | Suthar et al. |
| 2019/0394624 | A1 | 12/2019 | Karampatsis et al. |
| 2019/0394833 | A1 | 12/2019 | Talebi Fard et al. |
| 2020/0008069 | A1 | 1/2020 | Zhu et al. |
| 2020/0028920 | A1 | 1/2020 | Livanos et al. |
| 2020/0045753 | A1 | 2/2020 | Dao et al. |
| 2020/0045767 | A1 | 2/2020 | Velev et al. |
| 2020/0053670 | A1 | 2/2020 | Jung et al. |
| 2020/0053724 | A1 | 2/2020 | Molavianjazi et al. |
| 2020/0053828 | A1 | 2/2020 | Bharatia et al. |
| 2020/0059856 | A1 | 2/2020 | Cui et al. |
| 2020/0084663 | A1 | 3/2020 | Park et al. |
| 2020/0092423 | A1 | 3/2020 | Qiao et al. |
| 2020/0092424 | A1 | 3/2020 | Qiao et al. |
| 2020/0136911 | A1 | 4/2020 | Assali et al. |
| 2020/0192725 | A1* | 6/2020 | Feldkamp .............. G06F 9/5072 |

FOREIGN PATENT DOCUMENTS

| | | |
|---|---|---|
| CN | ZL 200780036907.1 | 2/2012 |
| EP | 0 950 952 A2 | 10/1999 |
| EP | 1 175 074 A2 | 1/2002 |
| IN | 333811 | 3/2020 |
| JP | 2006-279805 A | 10/2006 |
| KR | 10-2004-0057858 A | 7/2004 |
| KR | 10-2005-0002335 A | 1/2005 |
| KR | 10-2006-0025869 A | 3/2006 |
| WO | WO 00/69140 | 11/2000 |
| WO | WO 01/13228 A2 | 2/2001 |
| WO | WO 2008/019056 A2 | 2/2008 |
| WO | WO 2009/018418 A2 | 2/2009 |
| WO | WO 2011/100629 A2 | 8/2011 |
| WO | WO 2018/174021 A1 | 9/2018 |
| WO | WO 2018/174516 A1 | 9/2018 |
| WO | WO 2019/034609 A1 | 2/2019 |
| WO | WO 2019/220172 A1 | 11/2019 |
| WO | WO 2020/091934 A1 | 5/2020 |

OTHER PUBLICATIONS

Applicant-Initiated Interview Summary for U.S. Appl. No. 16/176,920 (dated Apr. 1, 2020).

Non-Final Office Action for U.S. Appl. No. 16/176,920 (dated Mar. 6, 2020).

Notification of Transmittal of the International Search Report and the Written Opinion of the International Searching Authority, or the Declaration for International Application Serial No. PCT/US2019/053912 (dated Dec. 18, 2019).

"3rd Generation Partnership Project; Technical Specification Group Services and System Aspects; Study on Enhancements to the Service-Based Architecture (Release 16)," 3GPP TR 23.742, V0.2.0, pp. 1-39 (Jun. 2018).

"5G; Procedures for the 5G System (3GPP TS 23.502 version 15.2.0 Release 15)," ETSI TS 123 502 V15.2.0, pp. 1-46 (Jun. 2018).

"Pseudo-CR on Service Discovery and Registration using NRF service," Ericsson, 3GPP TSG CT4 Meeting #79, 3GPP TR 29.891-v0.3.0, pp. 1-4 (Aug. 21-25, 2017).

Commonly-assigned, co-pending U.S. Appl. No. 16/176,920 for "Methods, Systems, and Computer Readable Media for Providing a Service Proxy Function in a Telecommunications Network Core Using a Service-Based Architecture," (Unpublished, filed Oct. 31, 2018).

"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).

"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).

(56) References Cited

OTHER PUBLICATIONS

Scholl et al., "An API First Approach to Microservices Development," Oracle, https://blogs.oracle.com/developers/an-api-first-approach-to-microservices-development, pp. 1-12 (Nov. 8, 2017).
Hearing Notice for Indian Application No. 1106/CHENP/2009 (May 28, 2015).
Notice of Allowance and Fee(s) Due for U.S. Appl. No. 13/197,566 (dated Feb. 20, 2015).
Notification of the Second Office Action for Chinese Application No. 201180013381.1 (dated Feb. 10, 2015).
Notification of Reexamination for Chinese Application No. 200880109633.9 (dated Jan. 29, 2015).
Extended European Search Report for European Patent Application No. 08796925.9 (dated Nov. 21, 2014).
Non-Final Office Action for U.S. Appl. No. 13/197,566 (dated Aug. 27, 2014).
Notification of Reexamination for Chinese Patent Application No. 200880109633.9 (dated Jul. 28, 2014).
Notification of the First Office Action for Chinese Application No. 201180013381.1 (dated Jun. 5, 2014).
First Examination Report for Indian Patent Application No. 1106/CHENP/2009 (dated Jan. 28, 2014).
Extended European Search Report for European Application No. 07836478.3 (dated Nov. 18, 2013).
Notice of Allowance and Fee(s) Due for U.S. Appl. No. 13/026,153 (dated Apr. 15, 2013).
Communication of European Publication No. And Information on the Application of Article 67(3) EPC for European Patent Application No. 11742923.3 (dated Nov. 21, 2012).
First Office Action for Chinese Patent Application No. 200820109633.9 (dated May 3, 2012).
Notification of Transmittal of the International Search Report and the Written Opinion of the International Searching Authority, or the Declaration for International Application No. PCT/US2011/024645 (dated Oct. 28, 2011).
Notice of Allowance for U.S. Appl. No. 11/510,284 (dated Dec. 9, 2010).
Chinese Office Action for Chinese Patent Application No. 200780036907.1 (dated Oct. 11, 2010).
Final Official Action for U.S. Appl. No. 11/510,284 (dated Jun. 22, 2010).
Official Action for U.S. Appl. No. 11/510,284 (dated Feb. 23, 2010).
Notice of Allowance and Fee(s) Due for U.S. Appl. No. 12/183,406 (dated Feb. 12, 2010).
3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
Tsou et al., "Realm-Based Redirection in Diameter," Internet Engineering Task Force, draft-ietf-dime-realm-based-redirect-02, pp. 1-7 (Oct. 27, 2009).
Final Official Action for U.S. Appl. No. 11/510,284 (dated Jul. 9, 2009).
Notification of Transmittal of the International Search Report and the Written Opinion of the International Searching Authority, or the Declaration for International Application No. PCT/US2008/071718 (dated Jan. 28, 2009).
Official Action for U.S. Appl. No. 11/510,284 (dated Dec. 24, 2008).
Notification of Transmittal of the International Search Report and the Written Opinion of the International Searching Authority, or the Declaration for International Application No. PCT/US07/17329 (dated Feb. 15, 2008).
A. B. Roach, "Session Initiation Protocol (SIP)-Specific Event Notification," dynamicsoft, Network Working Group, pp. 1-38 (Jun. 2002).
Rosenberg, "SIP Proxies," www.dynamicsoft.com, pp. 1-30 (Jul. 2000).
Wiesmann et al., "Understanding Replication in Databases and Distributed Systems," IEEE, pp. 464-474 (Apr. 10, 2000).
Wang et al., "A Signaling System Using Lightweight Call Sessions," IEEE, pp. 697-706 (Mar. 26, 2000).
Gribble et al., "The MultiSpace: an Evolutionary Platform for Infrastructural Services," the University of California at Berkeley, pp. 157-170 (Jun. 6, 1999).
Handley et al., "SIP: Session Initiation Protocol," IETF RFC 2543, pp. 1-153 (Mar. 1999).
Handley et al., "SDP: Session Description Protocol," IETF RFC 2327, pp. 1-42 (Apr. 1998).
S. Paul et al., "Reliable Multicast Transport Protocol (RMTP)," IEEE Journal on Selected Areas in Communications, vol. 15, No. 3, pp. 407-421 (Apr. 1997).
Lin et al., "A Reliable Multicast Transport Protocol," IEEE Infocom, pp. 1414-1424 (1996).
Commonly-assigned, co-pending International Application No. PCT/US19/53912 for "Methods, Systems, and Computer Readable Media for Providing a Service Proxy Function in a Telecommunications Network Core Using a Service-Based Architecture," (Unpublished, filed Sep. 30, 2019).
Commonly-assigned, co-pending U.S. Appl. No. 17/082,871 for "Methods, Systems, and Computer Readable Media for Rank Processing for Network Function Selection," (Unpublished, filed Oct. 28, 2020).

\* cited by examiner

METHODS, SYSTEMS, AND COMPUTER READABLE MEDIA FOR DISTRIBUTING NETWORK FUNCTION (NF) TOPOLOGY INFORMATION AMONG PROXY NODES AND FOR USING THE NF TOPOLOGY INFORMATION FOR INTER-PROXY NODE MESSAGE ROUTING

TECHNICAL FIELD

The subject matter described herein relates to distributing NF topology information, such as 5G core NF topology information, among proxy nodes, such as service communications proxies (SCPs) and security edge protection proxies (SEPPs). More particularly, the subject matter described herein relates to distributing NF topology information among proxy nodes and for inter-SCP and inter-SEPP routing of messages using the NF topology information.

BACKGROUND

In 5G telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is a combination of IP address and port number on a network node that hosts a producer NF. Producer NFs register with a network function repository function (NRF). The NRF maintains an NF profile of available NF instances and their supported services. Consumer NFs can subscribe to receive information about producer NF instances that have registered with the NRF.

In addition to consumer NFs, another type of network node that can subscribe to receive information about NF service instances is the SCP. The SCP subscribes with the NRF and obtains reachability and service profile information regarding producer NF service instances. Consumer NFs connect to the SCP, and the SCP load balances traffic among producer NF service instances that provide the required service or directly routes the traffic to the destination producer NF.

In addition to the SCP, other examples of proxy nodes or groups of network nodes that route traffic between producer and consumer NFs include the SEPP, the service gateway, and nodes in the 5G service mesh. The SEPP is the network node used to protect control plane traffic that is exchanged between different 5G PLMNs (Public Land Mobile Networks). As such, the SEPP performs message filtering, policing and topology hiding for all application programming interface (API) messages.

The service gateway is a node that sits in front of a group of producer NFs that provide a given service. The service gateway may load balance incoming service requests among producer NFs that provide the service in a manner similar to the SCP.

The service mesh is a name for a group of intermediate proxy nodes that enable communications between producer and consumer NFs. The service mesh may include one or more SCPs, SEPPs, and service gateways.

One problem with the existing 3GPP service architecture is routing of messages among proxy nodes when the destination NF is not located in the same network as the proxy node that receives a message. For example, when a mobile subscriber roams into a network served by an SCP that is not the subscriber's home SCP, it may be necessary to contact the subscriber's home user data management (UDM) node to provide services to the subscriber while the subscriber is roaming. The subscriber's home UDM node is reachable through the home SCP of the subscriber. A node (such as an access and mobility management function (AMF)) in the visited network may need to contact the subscriber's home UDM through the subscriber's home SCP (for example, for an update location transaction). The AMF sends an update location message to the SCP in the network in which the subscriber is currently located. The SCP in the network currently serving the subscriber does not know how to reach the subscriber's home SCP. Accordingly, the SCP sends the update location message to each SCP in the network until the home SCP is reached. The home SCP sends the message to the home UDM, and the home UDM responds to the AMF.

One problem with this scenario is that the messages that are sent to the incorrect SCPs unnecessarily waste network bandwidth. Another problem with this scenario is that the delay in locating the correct SCP results in a delay in providing the service to the subscriber. Such delay may be unacceptable for some services, such as call setup or gaming.

Accordingly, there exists a need for methods, systems, and computer readable media for distributing network topology information among proxy nodes and using the network topology information for inter-proxy node message routing.

SUMMARY

A method for distributing network function (NF) topology information among proxy nodes and for using the NF topology information for inter-proxy node message routing is provided. The method includes configuring a first proxy node as a leader service communications proxy (SCP). The method further includes configuring a plurality of second proxy nodes as worker proxy nodes. The method further includes registering the worker proxy nodes with the leader SCP. The method further includes subscribing, by the worker proxy nodes and with the leader SCP, to receive NF topology information from the leader SCP. The method further includes, at the leader SCP, receiving NF topology information from the worker proxy nodes and communicating the NF topology information to the worker proxy nodes subscribed to receive the NF topology information. The method further includes, at the worker proxy nodes, using the NF topology information to route messages to proxy nodes serving destination NFs.

According to another aspect of the subject matter described herein, configuring the first proxy node as the leader SCP includes configuring the first proxy node to receive NF topology information from the worker proxy nodes, store the NF topology information, and distribute the NF topology information among the worker proxy nodes.

According to yet another aspect of the subject matter described herein, configuring the second proxy nodes as worker proxy nodes includes configuring each of the second proxy nodes with the identity of the leader proxy node, to communicate the NF topology information of NFs connected to the second proxy node to the leader SCP and to receive NF topology information of other proxy nodes from the leader SCP.

According to yet another aspect of the subject matter described herein, registering the worker proxy nodes with the leader SCP includes communicating identities of NFs connected to each worker proxy node to the leader SCP.

According to yet another aspect of the subject matter described herein, subscribing with the leader SCP includes transmitting, from each of the worker proxy nodes, a subscribe message requesting NF topology information for at least one proxy node other than a sending proxy node of the subscribe message.

According to yet another aspect of the subject matter described herein, communicating the network topology information to the worker proxy nodes includes transmitting notify messages to the worker proxy nodes including the network topology information.

According to yet another aspect of the subject matter described herein, the method for distributing NF topology information among proxy nodes includes receiving an NF topology update from one of the worker proxy nodes, and, wherein communicating the NF topology information to the worker proxy nodes includes communicating the NF topology update to the worker proxy nodes subscribed to receive the NF topology information regarding the one worker proxy node.

According to yet another aspect of the subject matter described herein, using the network topology information to route messages to proxy nodes serving destination NFs includes, at one of the worker proxy nodes:
  receiving a message requiring service from an NF served by a proxy node other than the one worker proxy node that receives the message;
  accessing the NF topology information available to the one worker proxy node to identify the proxy node serving the NF from which the service is required; and
  routing the message to the proxy node serving the NF.

According to yet another aspect of the subject matter described herein, the second proxy nodes comprise SCPs.

According to yet another aspect of the subject matter described herein, the second wherein the second proxy nodes comprise worker service edge protection proxies (SEPPs).

According to yet another aspect of the subject matter described herein, a system for distributing network function (NF) topology information among proxy nodes and for using the NF topology information for inter-proxy node message routing is provided. The system includes a first proxy node configured as a leader service communications proxy (SCP). The system further includes a plurality of second proxy nodes configured as worker proxy nodes and including a registration module for registering with the leader SCP and communicating NF topology information to the leader SCP, a subscription module for subscribing with the leader SCP to receive, from the leader SCP, NF topology information of other proxy nodes, and an inter-proxy NF routing module for using the NF topology information of other proxy nodes to route messages to destination NFs served by the other proxy nodes. The leader SCP includes an inter-proxy node NF topology database for receiving and storing the NF topology information from the worker proxy nodes and an NF topology information distribution module for distributing the NF topology information to the worker proxy nodes subscribed to receive the NF topology information.

According to yet another aspect of the subject matter described herein, the worker proxy nodes are configured with the identity of the leader proxy node.

According to yet another aspect of the subject of the subject matter described herein, the registration modules of the worker proxy nodes are configured to communicate identities of NFs connected to each worker proxy node to the leader SCP.

According to yet another aspect of the subject matter described herein, the subscription module of each of the worker SCPs is configured to transmit a subscribe message requesting NF topology information for at least one proxy node or optionally all proxy nodes of the network, other than a sending proxy node of the subscribe message.

According to yet another aspect of the subject matter described herein, the NF topology distribution module is configured to transmit notify messages to the worker proxy nodes including the NF topology information.

According to yet another aspect of the subject matter described herein, the NF topology distribution module is configured to receive an NF topology update from one of the worker proxy nodes, and, in response, communicate the NF topology update to the worker proxy nodes subscribed to receive the NF topology information regarding the one worker proxy node According to yet another aspect of the subject matter described herein, one of the worker proxy nodes is configured to:
  receive a message requiring service from an NF served by a proxy node other than the one worker proxy node that receives the message;
  access the NF topology information available to the one worker proxy node to identify the proxy node serving the NF from which the service is required; and
  route the message to the proxy node serving the NF.

According to yet another aspect of the subject matter described herein, a non-transitory computer readable medium having stored thereon executable instructions that when executed by a processor of a computer control the computer to perform steps is provided. The steps include configuring a first proxy node as a leader service communications proxy (SCP). The steps further include configuring a plurality of second proxy nodes as worker proxy nodes. The steps further include registering the worker proxy nodes with the leader SCP. The steps further include subscribing, by the worker proxy nodes and with the leader SCP, to receive network function (NF) topology information from the leader SCP. The steps further include, at the leader SCP, receiving NF topology information from the worker proxy nodes and communicating the NF topology information to the worker proxy nodes subscribed to receive the NF topology information. The steps further include, at the worker proxy nodes, using the NF topology information to route messages to proxy nodes serving destination NFs.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
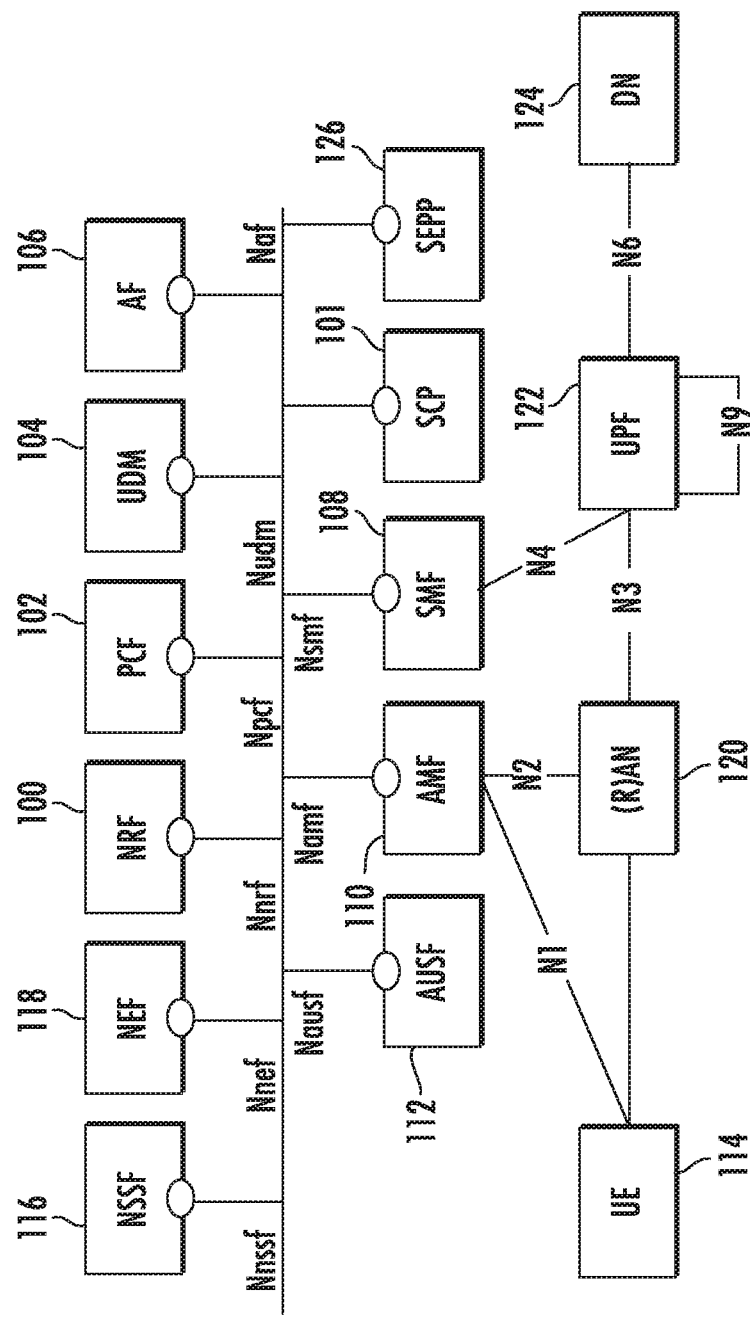
FIG. 1 is a network diagram illustrating an exemplary 5G network architecture.

The subject matter described herein relates to methods, systems, and computer readable media for distributing NF topology information among proxy nodes and for inter-proxy node routing of messages using the NF topology information. FIG. 1 is a block diagram illustrating an exemplary 5G system network architecture. The architecture illustrated in FIG. 1 is for the network of a single SCP, which is typically a single public land mobile network (PLMN). In FIG. 1, the network includes NRF 100 and SCP 101. As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NFs. In addition, SCP 101 may perform load balancing of connections between consumer and producer NFs.

NRF 100 is a repository for NF profiles. In order to communicate with a producer NF, a consumer NF or an SCP must obtain the NF profile from NRF 100. The NF profile is a JavaScript object notation (JSON) data structure defined in 3GPP TS 29.510. The NF profile definition includes at least one of a fully qualified domain name (FQDN), an Internet protocol (IP) version 4 (IPv4) address or an IP version 6 (IPv6) address.

In FIG. 1, any of the nodes (other than SCP 101 and NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as UE 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse a minimum of two SEPP functions, one for the home PLMN and the other for the foreign PLMN. In addition, if multiple messages are required to locate the home PLMN for a subscriber, multiple SEPPs and SCPs may be involved in a messaging transaction involving a subscriber in a foreign network.

As indicated above, one problem with the existing 3GPP service architecture is the inability of an SCP or SEPP to forward messages directly to a proxy node, such as an SCP-, in another network that is directly connected to the destination NF. SCPs act as hypertext transfer protocol (HTTP) proxies for service-based interface HTTP/HTTP2 signaling connecting NFs in the 5G core (5GC) network. Mobile network operators (MNOs) create a multiple 5GC networks, each consisting of a group of 5GC NFs serving a particular geographical region. Once such group of 5GC NFs is illustrated in FIG. 1. Such a group of 5GC NFs may be dedicated for subscribers located in a state (or group of states) in a country.

Figure 2:
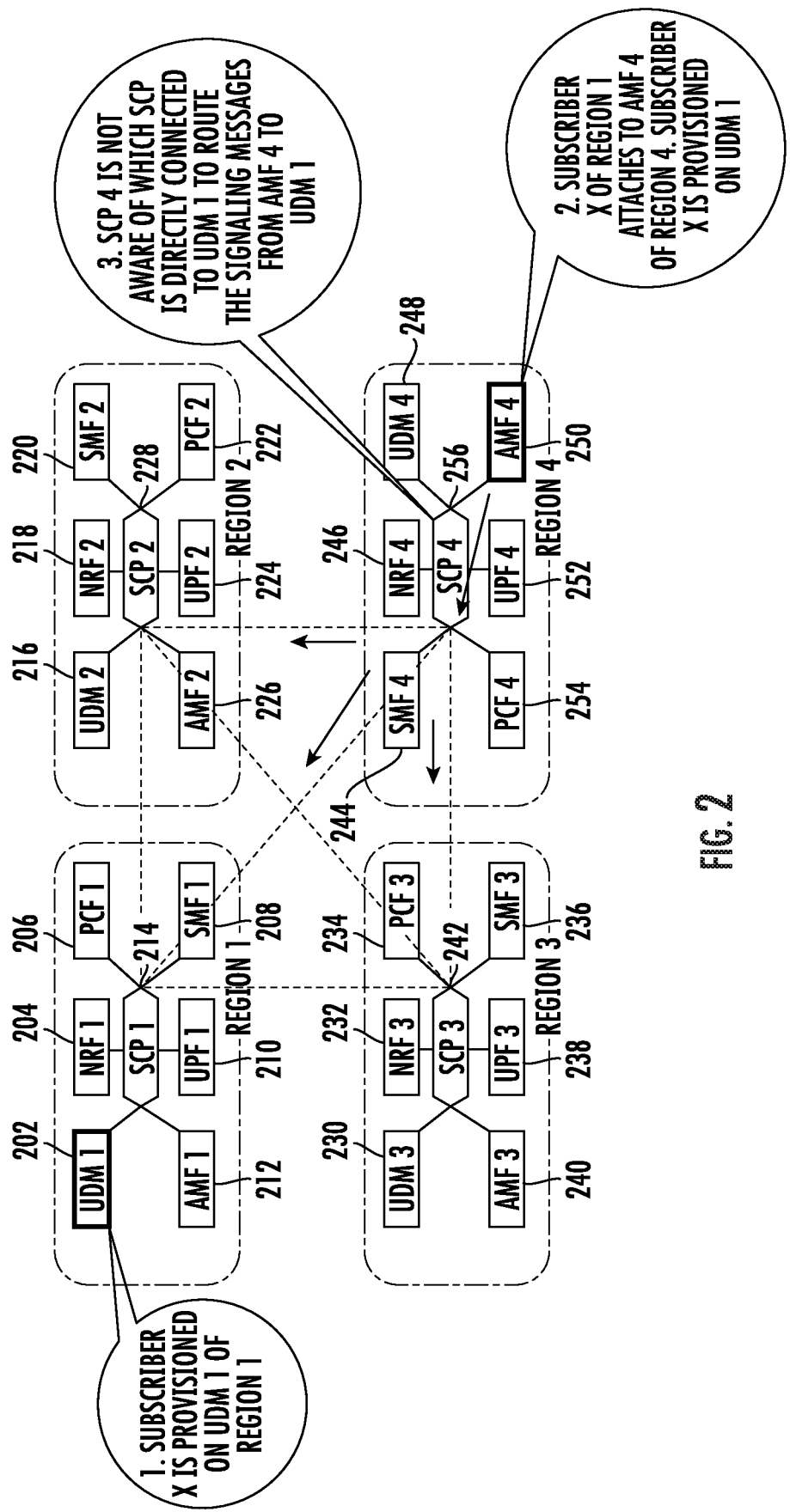
FIG. 2 is a network diagram illustrating inter-proxy node message routing without the distribution of NF topology information among proxy nodes located in different regions of an operator's network.

Each of these 5GC NF groups may have a dedicated SCP node for inter-NF communication within the group. The same SCP may also be used for inter-SCP communication when a subscriber moves from one region to another region. When the subscriber moves from region to another region, the SCP is not aware the subscriber's home network region SCP. FIG. 2 illustrates one such scenario. In FIG. 2, four different regions, region 1, region 2, region 3, and region 4 are illustrated. Region 1 includes the following NFs: UDM1 202, NRF1 204, PCF1 206, SMF1 208, UPF1 210, and AMF1 212. Region 1 further includes SCP1 214, which obtains and stores address and service information for all of NFs 202, 204, 206, 208, 210, and 212 in region 1. Region 2 includes the following NFs: UDM2 216, NRF2 218, SMF2 220, PCF2 222, UPF2 224, and AMF2 226. Region 2 further includes SCP2 228, which obtains and stores address and service information for all of NFs 216, 218, 220, 222, 224, and 226 in region 2. Region 3 includes the following NFs: UDM3 230, NRF3 232, PCF3 234, SMF3 236, UPF3 238, and AMF3 240. Region 3 further includes SCP3 242, which obtains and stores address and service information for all of NFs 230, 232, 234, 236, 238, and 240 in region 3. Region 4 includes the following NFs: SMF4 244, NRF4 246, UDM4 248, AMF4 250, UPF4 252 and PCF4 254. Region 4 further includes SCP4 256, which obtains and stores address and service information for all of NFs 238, 240, 242, 244, 246, and 248 in region 4. Although not illustrated in FIG. 2, an SEPP may be located at the edge of the network of one service provider to filter incoming traffic from outside of the service provider's network.

In FIG. 2, subscriber X is provisioned in UDM1 202 of region 1. Subscriber X roams to region 4 and attaches to AMF4 250 of region 4. AMF4 250, in performing its mobility management functions, attempts to register with the subscriber's home UDM, UDM1 202. AMF 4 250 sends the register message to SCP 4 256 of region 4. SCP 4 256 of region 4 is not directly attached to UDM1 202 of region 1. In the illustrated example, SCP4 256 randomly selects SCPs in an attempt to locate the SCP that is connected to UDM1 202 of region 1 and sends register message to SCPs in regions 1, 2, and 3. Only SCP1 214 in region 1 is connected to the destination UDM, UDM1 202. Sending the register messages to SCP2 228 in region 2 and SCP3 242 in region 4 can result in unnecessary messaging in the network, routing loops, and delay in the registration procedure.

In order to avoid the unnecessary messaging, routing loops, and delay in inter-proxy node messaging, the subject matter described herein provides for proxy nodes, such as SCPs and SEPPs, in the network to exchange messages with each other conveying the identities of the NFs that are directly connected to or served by each proxy node. Each proxy node will notify another proxy node in the network whenever an addition, deletion, or update to an NF connected to the serving proxy node occurs. One of the proxy nodes of a group of proxy nodes will be designated as a leader SCP to which other proxy nodes subscribe to receive updates regarding NFs connected to other proxy nodes in the network. The subscribing proxy nodes are referred to as worker proxy nodes. The worker proxy nodes communicate their NF topology information to the leader proxy node, and the leader proxy node provides the NF topology information to worker proxy nodes subscribed to receive the NF topology information. It should be noted that a worker proxy node can be an SCP or an SEPP. In addition, the subject matter described herein is not limited distributing NF topology information between proxy nodes in the same service provider's network. The exchange and use of NF topology information using the leader SCP and worker proxy nodes described herein can be implemented to exchange NF topology information regarding NFs of different network operators without departing from the scope of the subject matter described herein.

Figure 3:
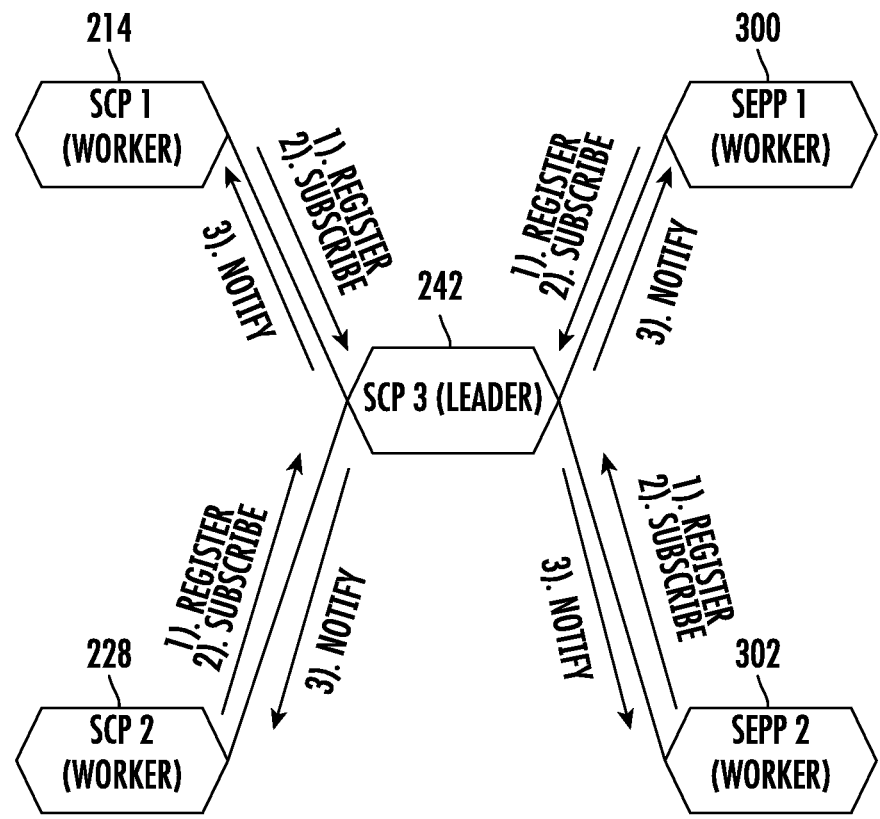
FIG. 3 is a network diagram illustrating a leader SCP, worker proxy nodes, messaging for communicating NF topology information to the leader SCP, and messaging for communicating NF topology information to worker proxy nodes.

FIG. 3 is a network diagram illustrating a leader SCP and worker proxy nodes that implement the solution described herein. In FIG. 3, SCP3 242 is the leader SCP and functions as the central repository for network topology information for all of the NFs served by leader SCP3 242, worker SCP1 214, worker SCP2 228, worker SEPP1 300, and worker SEPP2 302. Worker SCPs, such as worker SCP1 214 and worker SCP2 228, register with leader SCP3 242 by sending register messages to leader SCP3 242. The register messages include a list of the identities, service types, or other details of all of the NFs served by or directly attached to worker SCP1 214 and worker SCP2 228. Similarly, worker SEPP1 300 and worker SEPP2 302 send register messages to leader SCP3 242. The register messages include the identities of all of the NFs in the networks served by worker SEPP1 300 and worker SEPP2 302, respectively. The register messages may be hypertext transfer protocol (HTTP) or HTTP2 register messages.

Upon receiving the register messages, leader SCP3 242 may store the NF service information along with information identifying the serving SCP or SEPP in a database local to leader SCP3 242. Worker SCP1 214, worker SCP2 228, worker SEPP1 300 and worker SEPP2 302 may be configured to send the register messages with the NF information initially, when a worker SCP or SEPP is booted up and attached to the network and when changes to network topology connected to an SCP or SEPP occur. For example, each of worker SCP1 214, worker SCP2 228, worker SEPP1 300, and worker SEPP2 300 may be preconfigured with the identity of leader SCP3 242 and to send the initial registration message to leader SCP3 242. In addition, each of worker SCP1 214, worker SCP2 228, worker SEPP1 300, and worker SEPP2 300 may be configured to send a register message to leader SCP3 242 when an NF connected to a worker SCP or SEPP deregisters from the network to notify the leader SCP of the deregistration. The leader SCP may then remove the deregistered NF from its local database of NF and SCP/SEPP topology information. Similarly, when a new NF becomes connected to a worker SCP or SEPP, the worker SCP or SEPP may send a register message to the leader SCP to notify the leader SCP of the newly added NF. The leader SCP may add the identity new NF and its serving proxy node (SCP and/or SEPP) to its local database of NF and SCP/SEPP topology information. When a worker SCP or SEPP is notified of a change in capabilities (such as a software version update) of an NF connected to the worker SCP or SEPP, the worker SCP or SEPP sends a registration message to the leader SCP notifying the leader SCP of the change in NF capabilities. The leader SCP will then update the information in its local inter-proxy node NF topology database of the newly added NF information.

In addition to sending the register messages to the leader SCP, the worker SCPs and SEPPs send subscribe messages to the leader SCP to subscribe to receive notifications of changes in NF topology information regarding NFs connected to other worker SCPs or SEPPs or to the leader SCP. In the example illustrated in FIG. 3, worker SCP1 214, worker SCP2 228, worker SEPP1 300, and worker SEPP2 302 send subscribe messages to leader SCP3 242. Leader SCP3 242 sends notify messages to each of worker SCP1 214, worker SCP2 228, worker SEPP1 300, and worker SEPP2 302. The notify messages may be sent initially in response to the subscribe messages and when leader SCP3 242 receives a register message that includes a change in NF topology from a worker SCP or SEPP.

The notify messages may include the NF topology information for all of the SCPs and SEPPs connected to the leader SCP other than the self topology information of the subscribing SCP or SEPP. For example, the NF topology information in the notify message sent to worker SCP1 214 may include the identities of worker SCP2 228, worker SEPP1 300, worker SEPP2 302, leader SCP3 242 and topology information for NFs connected to worker SCP2 228, worker SEPP1 300, worker SEPP2 302, and leader SCP3 242. The NF topology information in the notify message sent to worker SCP2 228 may include the identities of worker SCP1 214, worker SEPP1 300, worker SEPP2 302, leader SCP3 242 and the topology information for NFs connected to worker SCP1 214, worker SEPP1 300, worker SEPP2 302, and leader SCP3 242. The NF topology information in the notify message sent to worker SEPP1 228 may include the identities of worker SCP1 214, worker SCP2 228, worker SEPP1 300, worker SEPP2 302, leader SCP3 242 and the topology information for NFs connected to worker SCP1 214, worker SCP2 228, worker SEPP2 302, and leader SCP3 242. The NF topology information in the notify message sent to worker SEPP2 302 may include the identities of worker SCP1 214, worker SCP2 228, worker SEPP1 300, leader SCP3 242 and the topology information for NFs connected to worker SCP1 214, worker SCP2 228, worker SEPP1 300, and leader SCP3 242. Once the SCPs and SEPPs have the NF topology information for the NFs connected to other SCPs and SEPPs in the network, the SCPs and SEPPs can send inter-SCP/SEPP messaging directly to the SCP or SEPP serving the destination NF for a particular subscriber, avoiding unnecessary signaling, delay, and routing loops.

The subscribe messages sent from worker SCPs/SEPPs to the preconfigured leader SCP may request a list of all the registered SCPs in the network and corresponding lists of NFs connected to/served by each of the SCPs. Each subscribe message may optionally include a subscription duration and an indication of whether the subscription request is for all proxy nodes in the network or individual proxy nodes (identified by SCP or SEPP fully qualified domain name (FQDN)). As indicated above, the leader SCP may include the list of the registered SCPs and corresponding list of NFs/NF services in the subscription response back to worker SCPs/SEPPs.

The notify messages are sent from leader SCP to worker SCP/SEPP when there is change in network topology, i.e., addition/deletion/updating of NF instances connected to individual registered SCPs. The notify message will also include an indication as to whether a de-registration of worker SCPs/SEPPs in the network has occurred. If the subscription duration is included a subscribe message for a given subscription, on expiry of subscription duration, each worker SCP/SEPP is required to send a new subscription request to the leader SCP to receive NF topology information from the leader SCP. Each worker SCP/SEPP will use the registered SCP list and corresponding NF list connected to each of the SCPs/SEPPs to route the HTTP2 signaling messages between NFs through the right SCP to which destination NF is directly connected.

Figure 4:
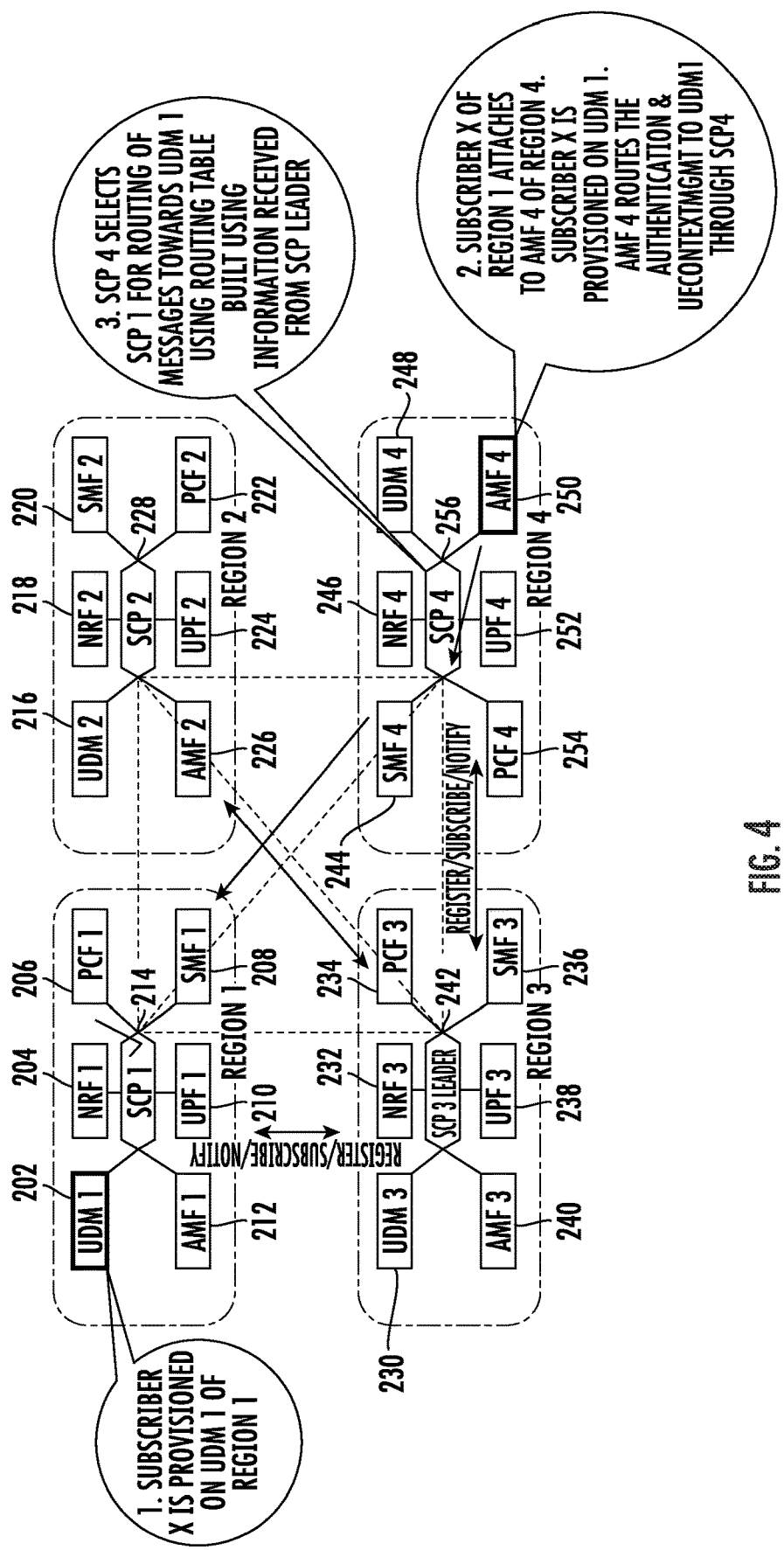
FIG. 4 is a network diagram illustrating inter-proxy node routing of messages using NF topology information obtained from a leader SCP.

FIG. 4 is a network diagram illustrating a network including a leader SCP, worker SCPs, the exchange of topology information and the routing of message directly to the serving SCP. In FIG. 4, SCP3 242 is configured as the leader SCP, and SCP1 214, SCP2 228, and SCP4 256 are configured as worker SCPs. Accordingly, worker SCP1 214, worker SCP2 228, and worker SCP4 254 are preconfigured with the identity of leader SCP3 242, and each of worker SCP1 214, worker SCP2 228, and worker SCP4 254 sends a register message to leader SCP3 242. To simplify the diagram, only the register message from worker SCP4 256 is illustrated in FIG. 4. Leader SCP3 242 sends notify messages to each of worker SCP1 214, worker SCP2 228, and worker SCP4 256. The notify messages may include the identities of the NFs connected to each of the worker SCPs. Each of worker SCP1 214, worker SCP2 228, and worker SCP4 256 may build an inter-SCP routing table based on the NF topology information received from leader SCP3 242. Table 1 shown below is an example of how the inter-SCP routing table of SCP4 256 in region 4 may be provisioned after receiving the NF topology information from leader SCP3 242.

| SCP | Connected NFs |
|---|---|
| SCP1 | AMF1, SMF1, UDM1, PCF1 |
| SCP2 | AMF2, SMF2, UDM2, PCF2 |
| SCP3 | AMF3, SMF3, UDM3, PCF3 |

Table 1: Inter-SCP Routing Data Built by SCP4 Using NF Topology Information Received from Leader SCP3

From Table 1, it can be seen that SCP4 includes a complete set of NF and SCP topology information for routing messages directly to the SCP that is connected to a destination NF for a particular message.

FIG. 4 illustrates the same messaging scenario illustrated in FIG. 2 except that SCP4 256 has obtained the NF topology information from leader SCP3 242. Referring to the message flow in FIG. 4, subscriber X is provisioned in UDM1 202 of region 1, roams to region 4, and attaches to AMF4 250 of region 4. AMF4 250 of region 4 sends authentication and user equipment (UE) context management messaging to SCP4 256, the serving SCP of AMF4 250. The authentication and context management messaging identifies UDM1 202 as the destination for the messaging. SCP4 256 performs a lookup in its inter-proxy node NF topology database using the identity of UDM1 202 extracted from the authentication and UE context management messaging and identifies SCP1 214 as the serving SCP of UDM1 202. Accordingly, SCP4 256 routes the authentication and UE context management messaging directly to SCP1 214 in region 1. SCP1 214 in region 1 routes the UE context management messaging to UDM1 202. Thus, using NF topology information obtained from the leader SCP, inter-SCP messaging can be achieved without the delays and unnecessary messaging illustrated in FIG. 2.

Figure 5:
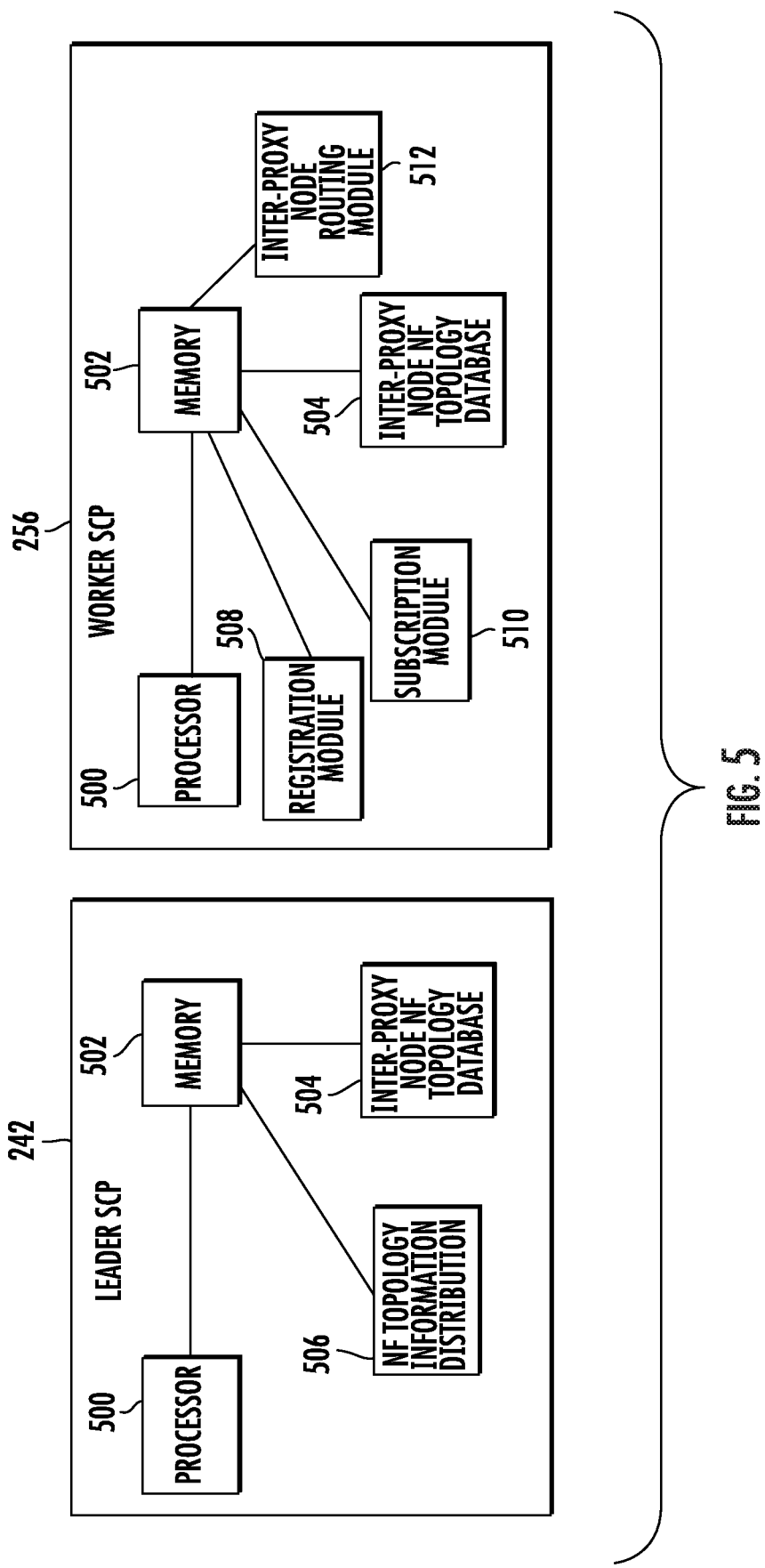
FIG. 5 is a block diagram illustrating architectures for a leader SCP and a worker proxy node.

FIG. 5 is a block diagram illustrating an exemplary architecture for a leader SCP and a worker proxy node. In FIG. 5, leader SCP3 242 includes at least one processor 500 and a memory 502. Leader SCP3 242 may include an inter-proxy node NF topology database 504 for receiving and storing NF topology information from proxy nodes. For example, inter-proxy node NF topology database may include a database front end that receives register messages from NF proxy nodes, such as SCPs and SEPPs and stores NF identity information and serving SCP or SEPP information in a database resident in memory 502. The database front end may store the information in a manner similar to that illustrated above in Table 1 so that serving proxy node and served NF information can be distributed to worker proxy nodes and used for inter-proxy node message routing. Leader SCP3 242 further includes an NF topology distribution module 506 which may be executable by processor 500 and resident in memory 502. NF topology distribution module 504 may receive subscribe messages from worker proxy nodes, obtain NF topology information from inter-proxy node NF topology database 504, and distribute the NF topology information to worker proxy nodes that are subscribed to receive the NF topology information.

FIG. 5 further illustrates an exemplary architecture for worker SCP4 256. In FIG. 5, worker SCP4 256 includes at least one processor 500 and a memory 502. Worker SCP4 256 further includes a number of modules resident in memory 502 and executable by processor 500. In the illustrated example, these modules include a registration module 508 for registering with the leader SCP3 242 and communicating NF topology information to leader SCP3 242. The modules further include a subscription module 510 for subscribing with leader SCP3 242 and receiving, from leader SCP3 242, NF topology information of other proxy nodes and storing the NF topology information in an inter-proxy node NF topology database 504. NF topology database 504 may be similar in structure to inter-proxy node NF topology database 504 maintained by leader SCP3 242 and may contain entries such as those illustrated above in Table 1. The modules may further include an inter-proxy NF routing module 512 for using the NF topology information of other proxy nodes to route messages to destination NFs served by the other proxy nodes. For example, inter-proxy NF routing module 512 may access database 504 using a destination NF identity extracted from a message received by worker SCP4 256 to determine how to route the message to the destination NF when the destination NF is served by a proxy node other than worker SCP4 256.

Figure 6:
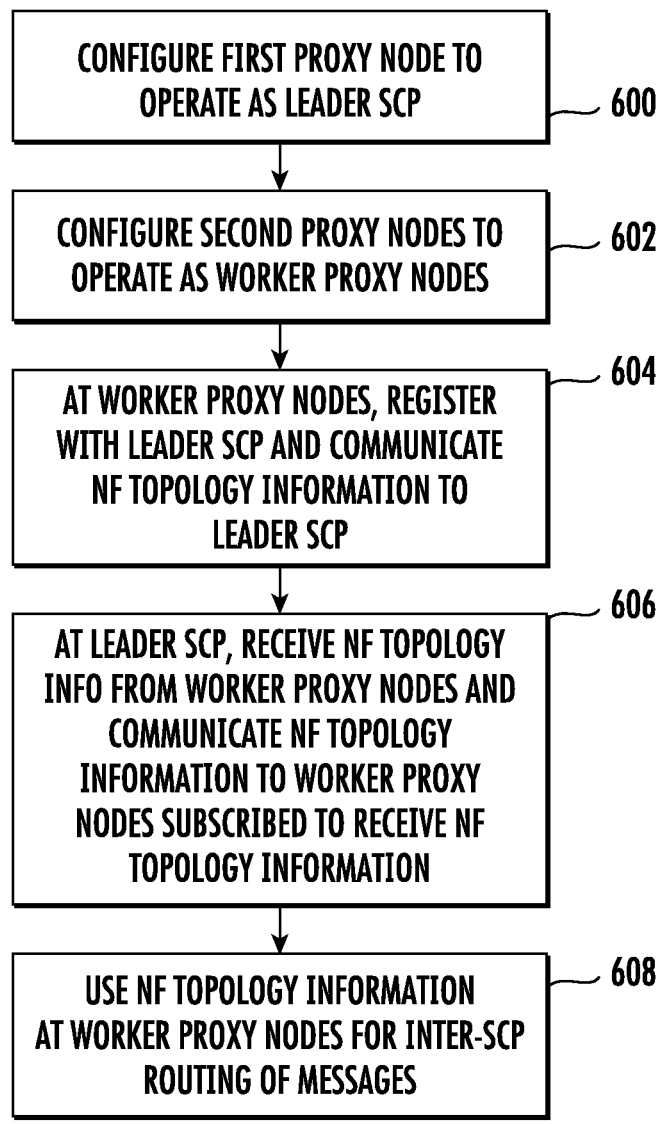
FIG. 6 is a flow chart illustrating an exemplary process performed by a leader SCP and a worker proxy node in obtaining, distributing, and using inter-proxy node topology information for inter-proxy node message routing.

FIG. 6 is a flow chart illustrating an exemplary process for distributing NF topology information among proxy nodes and for using the NF topology information for inter-proxy node message routing. Referring to FIG. 6, in step 600 the process includes configuring a first proxy node as a leader service communications proxy (SCP). For example, a network operator or a network equipment vendor may configure an SCP to function as the leader SCP. Functioning as a leader SCP may include receiving registration information from other proxy nodes (such as SCPs and SEPPs), obtaining topology information of the NFs connected to the SCPs or SEPPs, storing the topology information in an inter-proxy node NF topology database, and distributing the NF topology information to other SCPs subscribed to receive the NF topology information.

In step 602, the process includes configuring a plurality of second proxy nodes as worker proxy nodes. For example, a network operator or a network equipment vendor may configure SCPs and/or SEPPs to function as worker proxy nodes. Configuring the SCPs and/or SEPPs to function as worker proxy nodes may include configuring the SCPs and/or SEPPs with the identity of a leader SCP and to register with the leader SCP. The worker SCP/SEPP configuration may further include a list of SCP and/or SEPPs to which the worker SCP or SEPP may subscribe to receive network topology information.

In step 604, the process includes subscribing, by the worker proxy nodes and with the leader SCP, to receive NF topology information from the leader SCP. In one example, a worker proxy node may be configured to subscribe to all SCPs and/or SEPPs of which the leader SCP has NF topology information. In an alternate implementation, the worker proxy node may be configured to subscribe to a subset of SCPs and/or SEPPs of which the leader SCP has NF topology information. The worker proxy nodes may send subscribe messages to the leader SCP to create a subscription.

In step 606, the process includes, at the leader SCP, receiving NF topology information from the worker proxy nodes and communicating the NF topology information to the worker proxy nodes subscribed to receive the NF topology information. For example, the leader SCP may receive NF topology information from the worker proxy nodes when the worker proxy nodes register with the network or any time that NF topology information associated with a worker proxy node is updated. The leader SCP may transmit notify messages to worker proxy nodes subscribed to receive the NF topology information, where the notify messages identify the proxy nodes (e.g., SCPs or SEPPs) and the NFs (e.g., AMFs, UDMs, PCFs, etc.) served by each of the proxy nodes.

In step 608, the process includes using the NF topology information to route messages to proxy nodes serving destination NFs. For example, when a worker or a leader proxy node receives a message that is intended for an NF that is not directly connected to the proxy node, the proxy node may access its inter-proxy node NF topology database populated using the methodology described herein. The proxy node may use the identity (such as the FQDN) of the destination NF to access the inter-proxy node NF topology database. The result of the access will be the identity (e.g., the FQDN or IP address) of the proxy node that serves the destination NF. The proxy node will then route the message to the proxy node that serves the destination NF. The message may be routed directly from the proxy node that receives the message from one of its local NFs to the proxy node that serves the destination NF, avoiding the need to contact multiple proxy nodes in an attempt to find the proxy node that serves a particular NF.

It should be understood that while the examples described above include a single proxy node designated as a leader SCP, the subject matter described herein is not limited to such an implementation. As an operator's network grows, the operator may configure multiple SCPs as leader SCPs, where the leader SCPs each serve different groups of worker SCPs. So that each worker SCP can obtain a complete set of NF topology information, the leader SCPs may be deployed in a hierarchical manner such that the SCPs in the first level of leader SCPs each communicate directly with worker SCPs to obtain and distribute network topology information. The leader SCPs in the next level of leader SCPs may only communicate with leader SCPs in the first level to consolidate network topology information obtained by different leader SCPs. The leader SCP or SCPs in the highest level of the hierarchy may contain a complete set of NF topology information for all of the NFs in all of the regions of an operator's network. Thus, when a worker SCP subscribes to receive NF topology information for all of the NFs in an operator's network with a hierarchy of leader SCPs, the subscribe message may be forwarded up the levels in the hierarchy until the subscription reaches a level that contains the requested information, and a leader SCP in that level may provide the NF topology information to the requesting worker SCP.

Thus, using the system of leader SCPs and worker proxy nodes described herein, routing loops and unnecessary messaging resulting from routing messages to incorrect proxy nodes can be reduced and even avoided. In addition, latency in messaging associated with authentication and other transactions involving mobile subscribers and non-local NFs can be reduced.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for distributing network function (NF) topology information among proxy nodes and for using the NF topology information for inter-proxy node message routing, the method comprising:
configuring a first proxy node as a leader service communications proxy (SCP);
configuring a plurality of second proxy nodes as worker proxy nodes;

registering the worker proxy nodes with the leader SCP;
subscribing, by each of the worker proxy nodes and with the leader SCP, to receive NF topology information of other proxy nodes from the leader SCP;
at the leader SCP, receiving NF topology information from the worker proxy nodes and communicating the NF topology information of other proxy nodes to each of the worker proxy nodes subscribed to receive the NF topology information; and
at each of the worker proxy nodes, using the NF topology information of other proxy nodes to route messages to proxy nodes serving destination NFs.

2. The method of claim 1 configuring the first proxy node as the leader SCP includes configuring the first proxy node to receive NF topology information from the worker proxy nodes, store the NF topology information, and distribute the NF topology information among the worker proxy nodes.

3. The method of claim 1 wherein configuring the second proxy nodes as worker proxy nodes includes configuring each of the second proxy nodes with the identity of the leader proxy node, to communicate the NF topology information of NFs connected to the second proxy node to the leader SCP, and to receive the NF topology information of other proxy nodes from the leader SCP.

4. The method of claim 1 wherein registering the worker proxy nodes with the leader SCP includes communicating identities of NFs connected to each worker proxy node to the leader SCP.

5. The method of claim 1 wherein subscribing with the leader SCP includes transmitting, from each of the worker proxy nodes, a subscribe message requesting NF topology information for at least one proxy node other than a sending proxy node of the subscribe message.

6. The method of claim 5 wherein communicating the NF topology information of other proxy nodes to each of the worker proxy nodes subscribed to receive the NF topology information of other proxy nodes includes transmitting notify messages to each of the worker proxy nodes including the NF topology information of other proxy nodes.

7. The method of claim 1 comprising receiving an NF topology update from one of the worker proxy nodes, and, wherein communicating the NF topology information of other proxy nodes to each of the worker proxy nodes subscribed to receive the NF topology information of other proxy nodes includes communicating the NF topology update to the worker proxy nodes subscribed to receive the NF topology information regarding the one worker proxy node.

8. The method of claim 1 wherein using the NF topology information of other proxy nodes to route messages to proxy nodes serving destination NFs includes, at one of the worker proxy nodes:
receiving a message requiring service from an NF served by a proxy node other than the one worker proxy node that receives the message;
accessing the NF topology information available to the one worker proxy node to identify the proxy node serving the NF from which the service is required; and
routing the message to the proxy node serving the NF.

9. The method of claim 1 wherein the worker proxy nodes comprise worker service communications proxies (SCPs).

10. The method of claim 1 wherein the worker proxy nodes comprise worker service edge protection proxies (SEPPs).

11. A system for distributing network function (NF) topology information among proxy nodes and for using the NF topology information for inter-proxy node message routing, the system comprising:
a first proxy node configured as a leader service communications proxy (SCP); and
a plurality of second proxy nodes configured as worker proxy nodes and including a registration module for registering with the leader SCP and communicating NF topology information to the leader SCP, a subscription module for subscribing with the leader SCP to receive, from the leader SCP, NF topology information of other proxy nodes, and an inter-proxy NF routing module for using the NF topology information of other proxy nodes to route messages to destination NFs served by the other proxy nodes,
wherein the leader SCP includes an inter-proxy node NF topology database for receiving and storing the NF topology information from the worker proxy nodes and an NF topology information distribution module for distributing the NF topology information of other proxy nodes to each of the worker proxy nodes subscribed to receive the NF topology information of other proxy nodes.

12. The system of claim 11 wherein the worker proxy nodes are configured with the identity of the leader proxy node.

13. The system of claim 11 wherein the registration modules of the worker proxy nodes are configured to communicate identities of NFs connected to each worker proxy node to the leader SCP.

14. The system of claim 11 wherein the subscription module of each of the worker proxy nodes is configured to transmit a subscribe message requesting NF topology information for at least one proxy node other than a sending proxy node of the subscribe message.

15. The system of claim 14 wherein the NF topology distribution module is configured to transmit notify messages to each of the worker proxy nodes subscribed to receive the NF topology information of other proxy nodes, where each of the notify messages includes the NF topology information of other proxy nodes.

16. The system of claim 11 wherein the NF topology distribution module is configured to receive an NF topology update from one of the worker proxy nodes, and, in response, communicate the NF topology update to the worker proxy nodes subscribed to receive the NF topology information regarding the one worker proxy node.

17. The system of claim 11 wherein one of the worker proxy nodes is configured to:
receive a message requiring service from an NF served by a proxy node other than the worker proxy node that receives the message;
access the NF topology information available to the one worker proxy node to identify the proxy node serving the NF from which the service is required; and
route the message to the proxy node serving the NF.

18. The system of claim 11 wherein the second proxy nodes comprise service communications proxies (SCPs).

19. The system of claim 11 wherein the second proxy nodes comprise service edge protection proxies (SEPPs).

20. A non-transitory computer readable medium having stored thereon executable instructions that when executed by a processor of a computer control the computer to perform steps comprising:
configuring a first proxy node as a leader service communications proxy (SCP);
configuring a plurality of second proxy nodes as worker proxy nodes;

registering the worker proxy nodes with the leader SCP;
subscribing, by each of the worker proxy nodes and with the leader SCP, to receive network function (NF) topology information of other proxy nodes from the leader SCP;
at the leader SCP, receiving NF topology information from the worker proxy nodes and communicating the NF topology information of other proxy nodes to each of the worker proxy nodes subscribed to receive the NF topology information of other proxy nodes; and
at each of the worker proxy nodes, using the NF topology information of other proxy nodes to route messages to proxy nodes serving destination NFs.

\* \* \* \* \*